Figure 1:
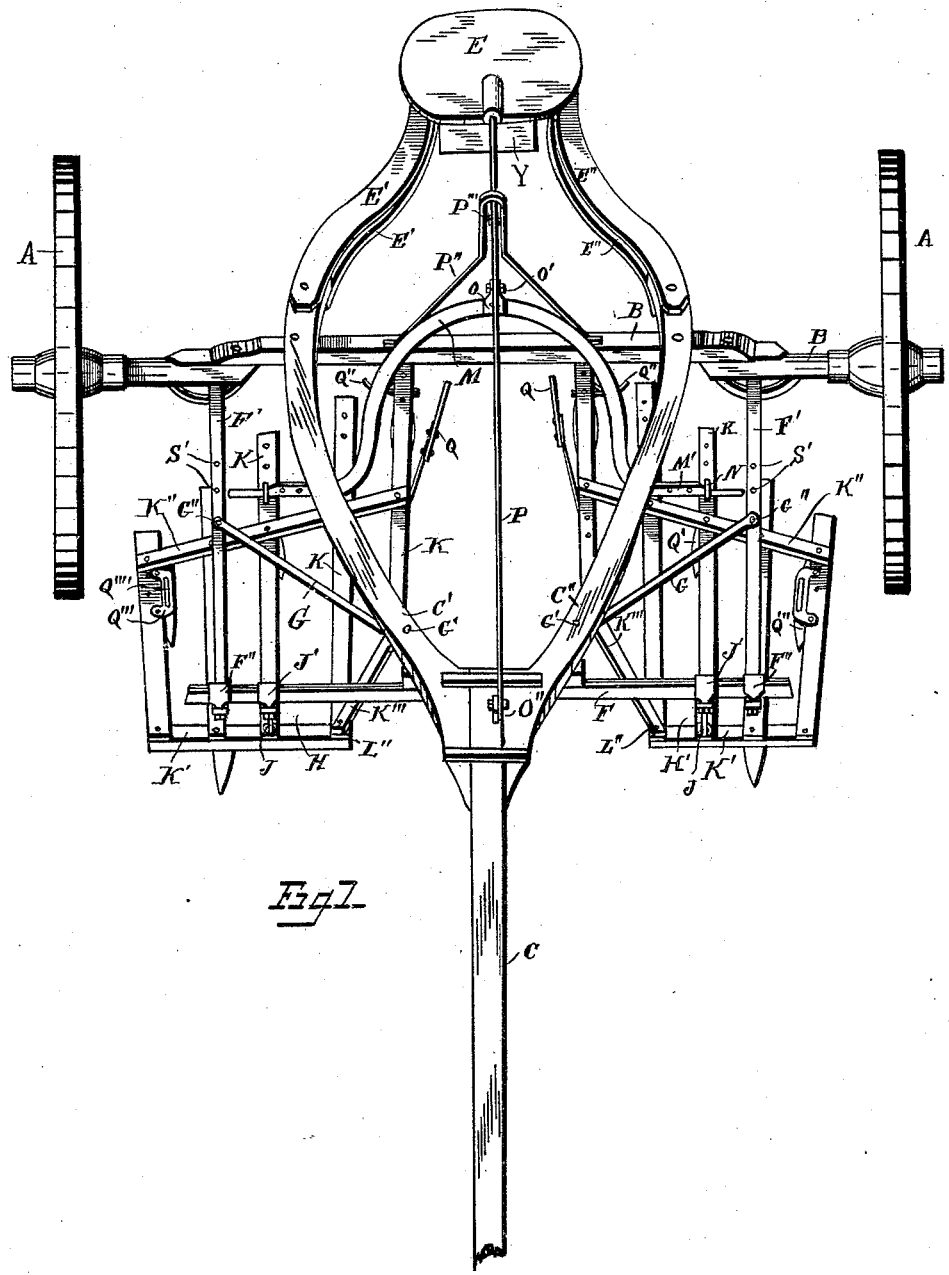

(No Model.)  3 Sheets—Sheet 1.

H. CARRIER.
CULTIVATOR.

No. 424,462.  Patented Apr. 1, 1890.

Witnesses.
Carroll J. Webster.
Anna J. Lehaney.

Inventor.
Horace Carrier
By William Webster
Atty

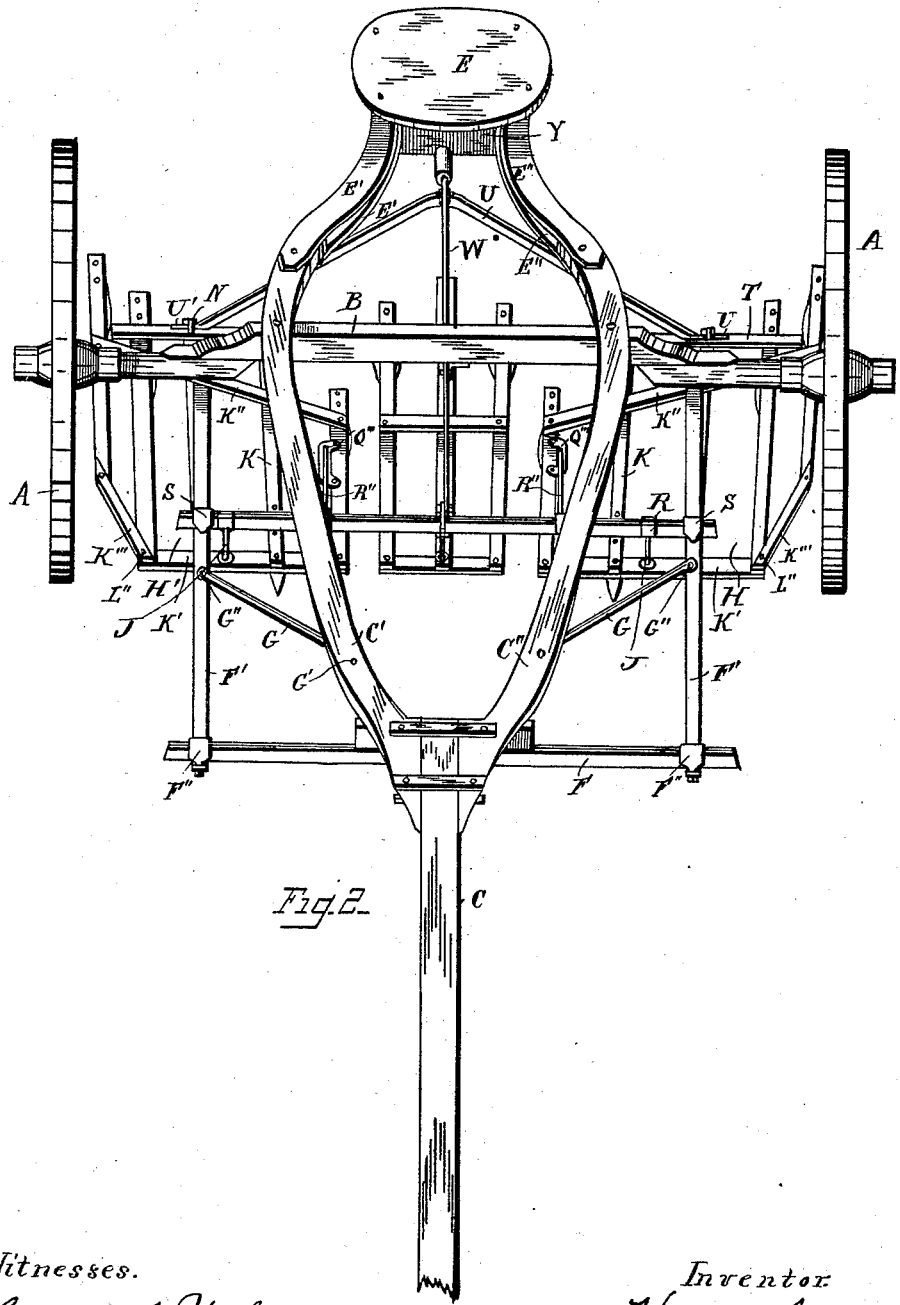

(No Model.) 3 Sheets—Sheet 3.
H. CARRIER.
CULTIVATOR.
No. 424,462. Patented Apr. 1, 1890.
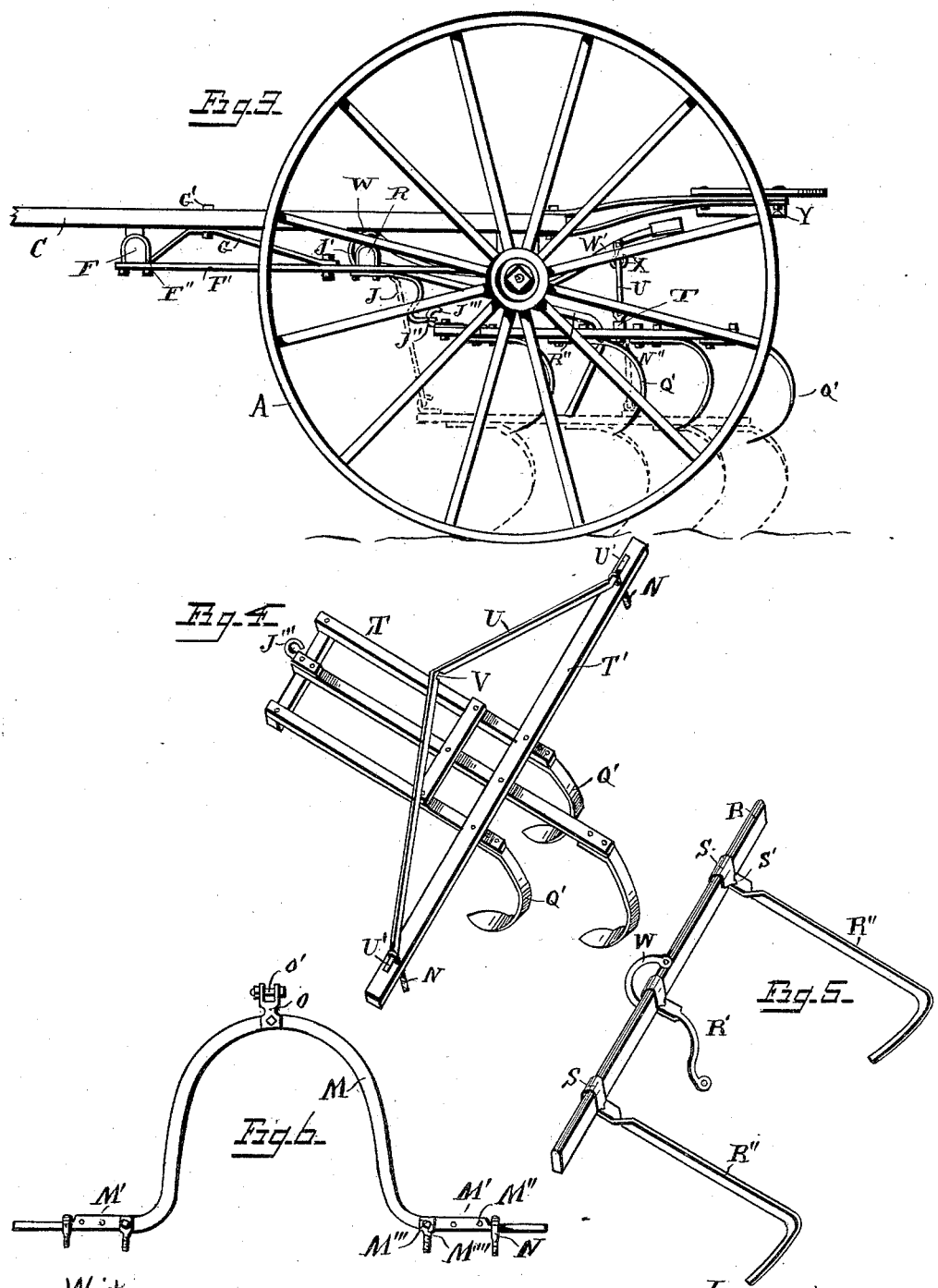
Witnesses.
Carroll J. Webster
Anna J. Dehaney
Inventor.
Horace Carrier
By William Webster
Atty

UNITED STATES PATENT OFFICE.

HORACE CARRIER, OF SWANTON, OHIO.

CULTIVATOR.

SPECIFICATION forming part of Letters Patent No. 424,462, dated April 1, 1890.

Application filed October 3, 1889. Serial No. 325,949. (No model.)

*To all whom it may concern:*

Be it known that I, HORACE CARRIER, a citizen of the United States, residing at Swanton, in the county of Fulton and State of Ohio, have invented certain new and useful Improvements in Convertible Corn and Fallow-Ground Cultivators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a convertible corn and fallow-ground cultivator, and has for its object to provide a riding-cultivator capable of being adjusted for the purpose of cultivating corn or any crops planted in rows, and in which the sections upon either side of the row shall be pivotally attached to the frame in a manner to be drawn normally in a straight line, but capable of being moved laterally by the foot of the driver, and with means by which the sections can be raised from the ground when desired, with means for converting the cultivator when so arranged to that of a fallow-ground cultivator or harrow.

The invention consists in constructing a cultivator with reversible side sections so arranged that when used as a corn-cultivator they shall be pivotally attached to a draw-bar to bring the same in front of the axle of the cultivator in a position to be observed as they pass the corn or plant being cultivated, and to be controllable by the operator, with provision for reversing the position of the side sections and of connecting a central section to form a cultivator the entire width, and also to render the draft upon the team lighter by moving the sections rearwardly relative to the axis.

The invention further consists in the parts and combination of parts hereinafter described, and pointed out in the claims.

In the drawings, Figure 1 is a plan view of a complete cultivator so arranged as to cultivate plants in rows. Fig. 2 is a like view of the cultivator when arranged as a fallow-ground cultivator. Fig. 3 is a side elevation of the device as shown in Fig. 2, the sections being shown let down in dotted lines. Fig. 4 is a perspective view of the central section. Fig. 5 is a detail view of the rear draw-bar and the guide-bars. Fig. 6 is a front elevation of a transverse yoke for adjusting the sections as to width, and by which the same are raised by means of a lever connected therewith and to the tongue.

A designates the wheels, B the axle, and C the tongue connected with the axle by hounds C' and C''.

E is a seat connected to spring-bars E' E' and E'' E'', which are connected with the hounds C' and C'', respectively, by being bolted thereon.

F designates a draw-bar attached to the tongue at the union of the hounds therewith and extends at right angles thereto, being braced by metal bars F', attached at each end of the draw-bar by clips F'' and to the axle.

G designates braces attached to the hounds by bolts G' and to the bars F' about midway their length by bolts G''.

H and H' designate the right and left hand sections, respectively, of the cultivator when looking from the rear.

Each section is composed of a series of bars K, secured in position by transverse bars K' and K'', the bars K increasing in length from the outer to the inner side thereof, the section being widest at the rear end by reason of the outer and inner bars K diverging slightly from the central bars. The inner bar of each section is connected with the transverse bar K' by metal straps K''', attached to the end of the bar K and to the transverse bar K' by bolts L''.

Each section H and H' is attached to draw-bar F by means of an angled hanger J, secured to the draw-bar by a clip J', each hanger being formed with a perforation J'' at the lower end, into which is engaged a hook J''' upon the section. This attachment not only draws the sections in a straight line, but connects them pivotally with the cultivator-frame.

M is a yoke (shown in detail in Fig. 6) formed with horizontal arms M', having perforations M'', through which is passed a bolt M''', for attaching a hanger M'''', which is attached to one of the bars K upon each section of the cultivator. The outer end of each arm is round and is passed through eyebolts N, also secured to one of the bars K. From the inner end of each arm the yoke extends upwardly, the upper arched portion being directly in front and somewhat above the seat E, at which point there is secured a hanger O, into which is pivoted a lever P, being secured thereto by a transverse bolt O', the inner end of the lever being fulcrumed to the tongue at O'', the free end projecting rearwardly in convenient position to be grasped by the driver.

P'' designates a guide for lever P, attached to the axle and extending above the apex of the yoke M a sufficient distance to allow the lever to be raised therein to suspend the sections free from contact with the ground when being transported from one field to another, there being a catch P''' formed near the top, with which the lever is engaged to hold the sections suspended.

Q designates fenders attached to the inner bars K of each section, and are designed to protect the plants from being covered with earth by the cultivator-teeth Q', attached to the bars K.

Q'' are foot-rests attached one to each of the inner bars K, and serve as a means by which the sections can be moved laterally by the foot of the operator should a plant be out of line and in the path of one of the teeth of the cultivator.

Q''' are guide-irons attached to the outer bar of each section, each guide-iron being formed with an elongated opening Q'''', for a purpose hereinafter described.

Thus far the device has been described as a corn-cultivator, the operation of which will be obvious. The sections H and H' are separated the desired distance apart to accommodate the different character of plants to be cultivated by moving bolts M''' into any of the holes M'' of the yoke.

The driver is seated upon seat E, and in driving from one field to another raises the sections to free the teeth from the ground by means of lever P, which is raised and engaged with hook P'''' of guide P''.

When in the act of cultivating, the lever is disengaged from hook P''' and the teeth allowed to enter the soil, the driver resting one foot on each rest Q'' and moving the sections laterally when necessary by pushing upon one or the other of the foot-rests.

To change to a fallow-ground cultivator, the yoke M, lever P, and guide P'' are removed and sections H and H' are unhooked from hangers J and their positions transposed, section H being placed upon the left and section H' upon the right side, and the section moved back to suspend the same nearer the axle. A cross-bar R, provided with a hanger R' centrally thereof, and with guides R'' near each end, is attached to bars F' by clips S, passing through perforations S' in said bars. Hangers J are removed from draw-bar F and placed upon the outer ends of bar R and the sections H and H' attached thereto.

T designates a central section of cultivator, also provided with teeth Q' and a hook J''', which engages with hangers R' of bar R, thereby making a closed cultivator the entire width between the wheels.

T' designates a cross-bar rigidly connected with section T by being bolted thereto, and also rigidly connected to sections H and H' by means of eyebolts N, which are of a sufficient length to pass through the cross-bar and bars K and be firmly secured by nuts N''.

U is a suspension-bar formed with horizontal rounded ends U', which are passed through the perforations in eyebolts N. From the horizontal ends U' the bar is bent in an inverted-V shape, having a notch V at the under portion of the apex.

W designates an arched bar, either formed integral with hanger R' or formed separate and held in place by the same clip.

W' is a hand-lever pivotally attached to bar W and extending to near the driver's seat. Lever W' is provided with a hook X, adapted to be engaged within notch V of suspension-bar U to suspend the cultivator from the ground.

To prevent lateral movement of the cultivator, guides R'' are passed through slots Q'''' in guide-irons Q'''.

Y designates a tool-box attached to the under side of seat E.

It will be seen that by the double springs E' E'' all jar to the driver is avoided in passing over uneven ground.

The draft upon the cultivator-sections when assembled as described is evenly distributed, and lowering the same is easily accomplished by means of lever W'.

What I claim is—

1. In a cultivator, the combination, with the frame, of the side sections pivotally attached thereto, the guide-irons secured to the said side sections, and the depending guide-rods secured to the frame and engaging with the guide-irons, and a central section pivotally connected with the side sections, substantially as shown and described.

2. In a cultivator, the combination, with a main frame, of the side sections pivoted thereto, an upwardly-curved yoke attached to the said sections, a lever secured to the tongue and connected with the said yoke, and a guide-frame secured to the main frame and provided with a catch adapted to hold the lever and sections in an elevated position, substantially as and for the purpose described.

3. In a cultivator, the combination, with a main frame, of the side sections pivoted thereto, the guide-irons attached to the inner bars of said sections, the depending guide-rods secured to the frame and engaging with the guide-irons on the sections, a central section pivotally connected with the frame and rigidly connected with the side sections, a hand-lever attached to the main frame and provided near its rear end with a hook, and a suspension-bar connecting the side sections and adapted for engagement with the said hook, whereby the sections are held in a raised position, substantially as shown and described.

4. In a cultivator, the combination, with a main frame, of the side sections and forward hangers connecting said sections and main frame, the upwardly-curved yoke having in its horizontal end a series of perforations, hangers secured to said end in said perforations and connecting the said ends and side sections, a lever pivoted at its forward end to the tongue and connected with the yoke near its center, a guide-frame secured to the main frame and provided with a catch adapted for engagement with the said lever, fenders secured to the inner sides of the sections, and foot-rests attached to said sections, all arranged and adapted to operate substantially as shown and described.

In testimony that I claim the foregoing as my own I hereby affix my signature in presence of two witnesses.

HORACE CARRIER.

Witnesses:
WILLIAM WEBSTER,
CARROLL J. WEBSTER.